US009247462B2

(12) United States Patent
Vandemoere et al.

(10) Patent No.: US 9,247,462 B2
(45) Date of Patent: Jan. 26, 2016

(54) VOICE QUALITY CONTROL

(75) Inventors: Davy Vandemoere, Watermael-Boitsfort (BE); Guillaume Binet, Watermael-Boitsfort (BE)

(73) Assignee: Mondial Telecom S.A. (BE)

( * ) Notice: Subject to any disclaimer, the term of this patent is extended or adjusted under 35 U.S.C. 154(b) by 0 days.

(21) Appl. No.: 14/112,932

(22) PCT Filed: Apr. 20, 2012

(86) PCT No.: PCT/EP2012/057324
§ 371 (c)(1),
(2), (4) Date: Sep. 22, 2014

(87) PCT Pub. No.: WO2012/143536
PCT Pub. Date: Oct. 26, 2012

(65) Prior Publication Data
US 2015/0065134 A1  Mar. 5, 2015

(30) Foreign Application Priority Data
Apr. 20, 2011  (EP) ..................................... 11163304

(51) Int. Cl.
*H04W 36/30* (2009.01)
*H04W 24/02* (2009.01)
*H04W 88/06* (2009.01)
*H04W 36/00* (2009.01)
*H04L 29/06* (2006.01)

(52) U.S. Cl.
CPC ........... *H04W 36/0022* (2013.01); *H04L 65/80* (2013.01); *H04W 24/02* (2013.01); *H04W 36/30* (2013.01); *H04W 88/06* (2013.01); *H04L 65/1083* (2013.01)

(58) Field of Classification Search
CPC ........ H04W 36/12; H04W 36/14; H04W 4/22
USPC ........... 455/41.2, 552.1, 436, 452.2; 370/235, 370/328
See application file for complete search history.

(56) References Cited

U.S. PATENT DOCUMENTS

| 6,785,262 | B1 * | 8/2004 | Yao ........................ G10L 19/002 370/352 |
| 2006/0198360 | A1 | 9/2006 | Biage et al. |
| 2007/0183323 | A1 | 8/2007 | Hannu et al. |
| 2007/0249291 | A1 | 10/2007 | Nanda et al. |
| 2008/0089325 | A1 | 4/2008 | Sung |
| 2008/0102815 | A1 | 5/2008 | Sengupta et al. |
| 2009/0170557 | A1 * | 7/2009 | Chauhan ............... H04W 36/14 455/552.1 |

FOREIGN PATENT DOCUMENTS

EP 2326126 A1 5/2011
WO WO2010141792 A1 12/2010

* cited by examiner

*Primary Examiner* — George Eng
*Assistant Examiner* — Joseph Dean, Jr.
(74) *Attorney, Agent, or Firm* — Richards Patent Law P.C.

(57) ABSTRACT

Described herein is multi-mode communications system that comprises at (east one internet network {540, 545), a mobile network (560), a platform (505) and a multi-mode terminal (575). Both the platform (505) and the terminal (575) are connectable to one of the internet networks (540, 545) and to the mobile network (560). A voice quality control module (525) is provided for determining if the voice call quality of a call to or from the terminal (575) via an internet network (540, 545) meets a predetermined minimum voice quality level. Handover between the internet network (540, 545) and mobile network (560) is initiated when the voice call quality falls below the predetermined minimum voice quality level.

16 Claims, 13 Drawing Sheets

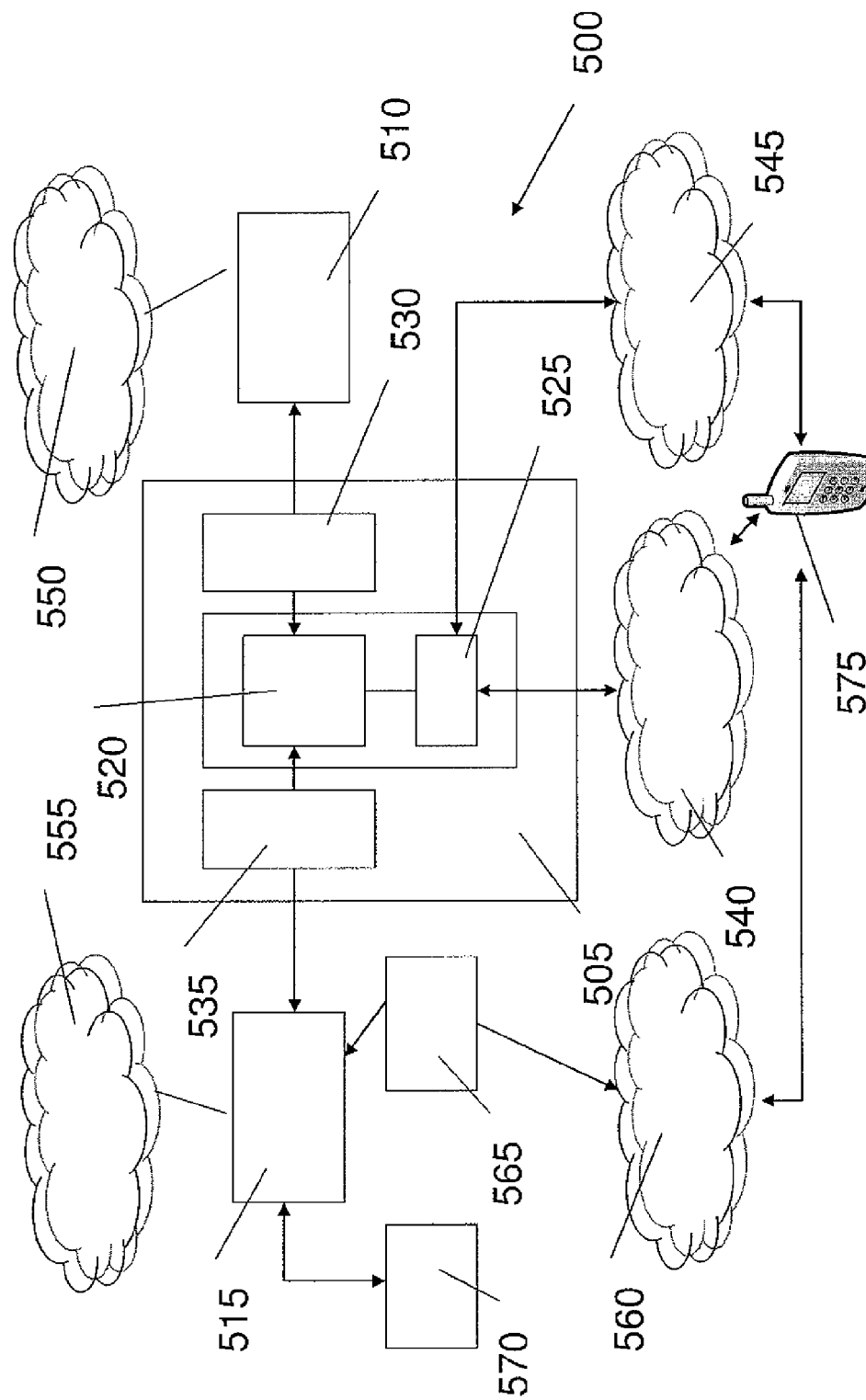

VOICE QUALITY CONTROL

The present invention relates to improvements in or relating to voice quality control, and is more particularly, although not exclusively, concerned with voice call quality for handover between modes in multi-mode telecommunications systems.

Voice communications have recently known rapid advances in two parallel fields. The first field is that of cellular telephony, which has allowed an increased mobility of telephony users. A second, more recent field is that of Voice-over-Internet-Protocol (VoIP) communications, wherein voice communications are routed over IP networks. While both cellular telephony and VoIP communications have provided undeniable advantages, their parallel development has led also to some drawbacks for a user wishing to exploit both.

Dual mode terminals, independently connectable both to a public switched telephone network (PSTN) and to internet protocol (IP) networks, have been developed. In particular, such dual mode terminals have been developed that comprise both a mobile telephony transceiver for wirelessly connecting the dual mode terminal to a cellular PSTN, such as, for example, a GSM (Global System for Mobile communications) network or a universal mobile telecommunications system (UMTS) network, and a wireless Local Area Network (LAN) transceiver for connecting to an IP network over a wireless LAN. The existence of such dual mode terminals, coupled to the increasing popularity of VoIP, has led to the emergence of the concept of Fixed-Mobile Convergence (FMC), proposing a single communications system encompassing both a cellular PSTN and an IP network, so that the dual mode terminal can maintain communications with this communication system using either one of its connections.

WO-A-00/79814 discloses one such communications system comprising both a PSTN and an IP network. In this communications system, a first one of the networks comprises a home location register with which the dual mode terminal is registered, and the second network comprises a serving location register. When the dual use terminal connects to this second network, the serving location register sends updated location information to the first network.

US-A-2005/0096024 discloses a similar communications system to that of WO-A-00/79814 in which, when the dual mode terminal connects to the IP network, the IP network has to transmit its IP address to a location register in the PSTN.

US-A-2009/0131045 discloses another communications system comprising a PSTN and an IP network. In this system, incoming calls directed to the dual mode terminal are always forcedly routed over the IP network. If the dual mode terminal is not connected to the IP network at the time, they are routed back from the IP network to the PSTN. While this system no longer requires a location update to be sent from the IP network to the PSTN each time that the dual mode terminal connects to or disconnects from the IP network, it requires considerable bandwidth between the two networks, especially when the dual mode terminal is not connected to the IP network. In this case the call must be transmitted from the PSTN to the IP network and then back to the PSTN.

Whilst the problem of handing over an ongoing call when a dual mode terminal goes from an IP network to a PSTN has been described in many documents, for example, by the 3$^{rd}$ Generation Partnership Project (3GPP™) in its Technical Specification 3GPP TS 23.206. However, to perform call handover with voice call continuity, this technical specification also requires additional resources in the form of an IP Multimedia Subsystem (IMS).

US-A-2006/0198360 discloses a communications system and a method for handing over a call when a dual mode terminal goes from an IP network to a PSTN. Here, the IP network comprises a call manager which initiates a continuity call to the dual mode terminal over the PSTN if the connection over the IP network is impaired.

EP-A-2018014 discloses a communications system and method in which a continuity call is initiated by a dual mode handset, which is connectable to both an IP network and a land-based network, either manually or automatically, if the connection over the IP network is impaired. Here, a Private Branch Exchange (PBX) is connected to the outside world over an Integrated Services Digital Network (ISDN) and all calls are routed through it. When a call is to be handed over between an IP network and a land-based network, the handset initiates putting the first call (the call in progress between the handset and a remote device) on hold by sending a message to the PBX. The PBX forwards the message to the removed device. A second call is established between the handset and the PBX with a third call being established between the PBX and the remote device. The first call is terminated once the connection between the handset and the remote device has been routed via the second and third calls.

US 200610121902 and US-A-2008/0273505 also disclose communications systems and methods for handing over a call when a dual mode terminal goes from an IP network to a PSTN.

It is therefore an object of the present invention to provide a system and method for determining handover between networks in a multi-mode communications system in accordance with voice call quality within one of the networks.

In accordance with a first aspect of the present invention, there is provided a multi-mode communication system including at least one Internet protocol network, at least one mobile telecommunications network, a telecommunications platform and at least one multi-mode terminal, both said telecommunications platform and said at least one multi-mode terminal being connectable to said at least one internet protocol network and to said mobile telecommunications network, said system comprising: — at least one voice continuity control module for ensuring call continuity for a call involving at least one multi-mode terminal when connected to said at least one Internet protocol network;

characterised in that said system further comprises at least one voice quality control module for determining voice call quality of a call involving said at least one multi-mode terminal when connected to said at least one internet protocol network;

and in that said at least one voice continuity control module operates to initiate handover between said at least one Internet protocol network and said at least one mobile telecommunications network in accordance with a predetermined minimum voice quality level determined by said at least one voice quality control module.

The present invention has particular application to communication systems that operate with mobile-to-mobile convergence (MMC) platform. In such a system, voice quality can be determined by both the MMC platform and a multi-mode terminal that has the MMC application and can be adapted in accordance with specific requirements of a subscriber or system operator.

The system further comprises a call handler associated with said at least one voice continuity control module, said call handler operating to initiate handover between said at least one Internet protocol network and said at least one mobile telecommunications network.

The predetermined minimum voice quality level can be determined in accordance with Internet protocol availability, mobile telecommunications network availability, and/or real-time transport control protocol relating to the voice traffic of a call currently in process that is provided by a real-time transport control protocol module.

The term "availability" as used here relates to the ability to detect the presence of the relevant network, the determination of whether it is possible to connect to the relevant network, and whether the relevant network meets the criteria for operation in the system, for example, is the signal strength at a sufficient level to ensure a good connection.

A real-time protocol analyser module may also provide real-time protocol data relating to voice traffic of the call, the predetermined minimum voice quality level being determined in accordance with the real-time protocol. A database in which data relating to at least one user of the system may also be provided and the predetermined minimum voice quality level being determined in accordance with said user data. Multi-mode terminal data relating to the terminals associated with the system may also be used for determining the predetermined minimum voice quality.

In one embodiment, the platform comprises a first voice quality control module and a first voice continuity control module and the multi-mode terminal associated with the platform comprises a second voice quality control module and a second voice continuity control module, said predetermined minimum voice quality of an ongoing call being determined by at least one of said first and second voice quality control modules and said handover being initiated by at least said first voice continuity control module.

In accordance with another aspect of the present invention, there is provided a multi-mode terminal for use in a multi-mode communications system as described above, wherein said terminal comprises a voice quality control module including an internet protocol manager for detecting availability of said at least one internet protocol network and for determining if voice quality meets said predetermined minimum voice quality associated with said at least one internet protocol network and initiating handover between said at least one internet protocol network and said mobile telecommunications network.

It is preferred that the multi-mode terminal connects to an Internet protocol network in preference to a mobile telecommunications network. The terminal initiates handover from said Internet protocol network to the mobile telecommunications network when said voice quality in the IP network falls below the predetermined minimum voice quality, the handover being initiated in accordance with internet protocol network availability and/or mobile telecommunications network availability.

Preferably, the multi-mode terminal comprises a voice continuity control module for initiating handover between said at least one internet protocol network and said mobile telecommunications network when said voice quality falls below said predetermined minimum voice quality. The multi-mode terminal may further comprise a real-time transport control protocol module providing real-time transport control protocol relating to voice traffic of said call and/or a real-time protocol analyser module providing real-time protocol data relating to voice traffic of said call, said predetermined minimum voice quality level being determined in accordance with said real-time transport control protocol and/or said real-time protocol.

In accordance with a further aspect of the present invention, there is provided a method for performing handover for a voice call between an Internet protocol network and a mobile telecommunications network in a multi-mode communications system, said system having at least one internet protocol network, at least one mobile telecommunications network, a telecommunications platform and at least one multi-mode terminal, both said telecommunications platform and said at least one multi-mode terminal being connectable to said at least one internet protocol network and said at least one mobile telecommunications network, said method comprises the steps of: — a) assigning a predetermined minimum voice quality level for a voice call connected to said at least one internet protocol network;

b) determining voice call quality for said at least one internet protocol network;

c) comparing said determined voice call quality with said predetermined minimum voice quality level; and d) initiating handover of said voice call between said at least one internet protocol network and said at least one mobile telecommunications network when said determined voice call quality falls below said predetermined minimum voice quality level.

Preferably, step d) comprises initiating handover in accordance with internet protocol network coverage and/or mobile telecommunications network availability.

Step a) may comprise assigning said predetermined minimum voice quality level in accordance with one of: user data; multi-mode terminal data; real-time protocol voice traffic; and real-time transport control protocol information.

Additionally, step a) may comprise establishing a voice call via an internet protocol network in preference to a mobile telecommunications network.

For a better understanding of the present invention, reference will now be made, by way of example only, to the accompanying drawings in which: —

FIG. 5 illustrates MMC architecture in accordance with the present invention;

Figure 1:
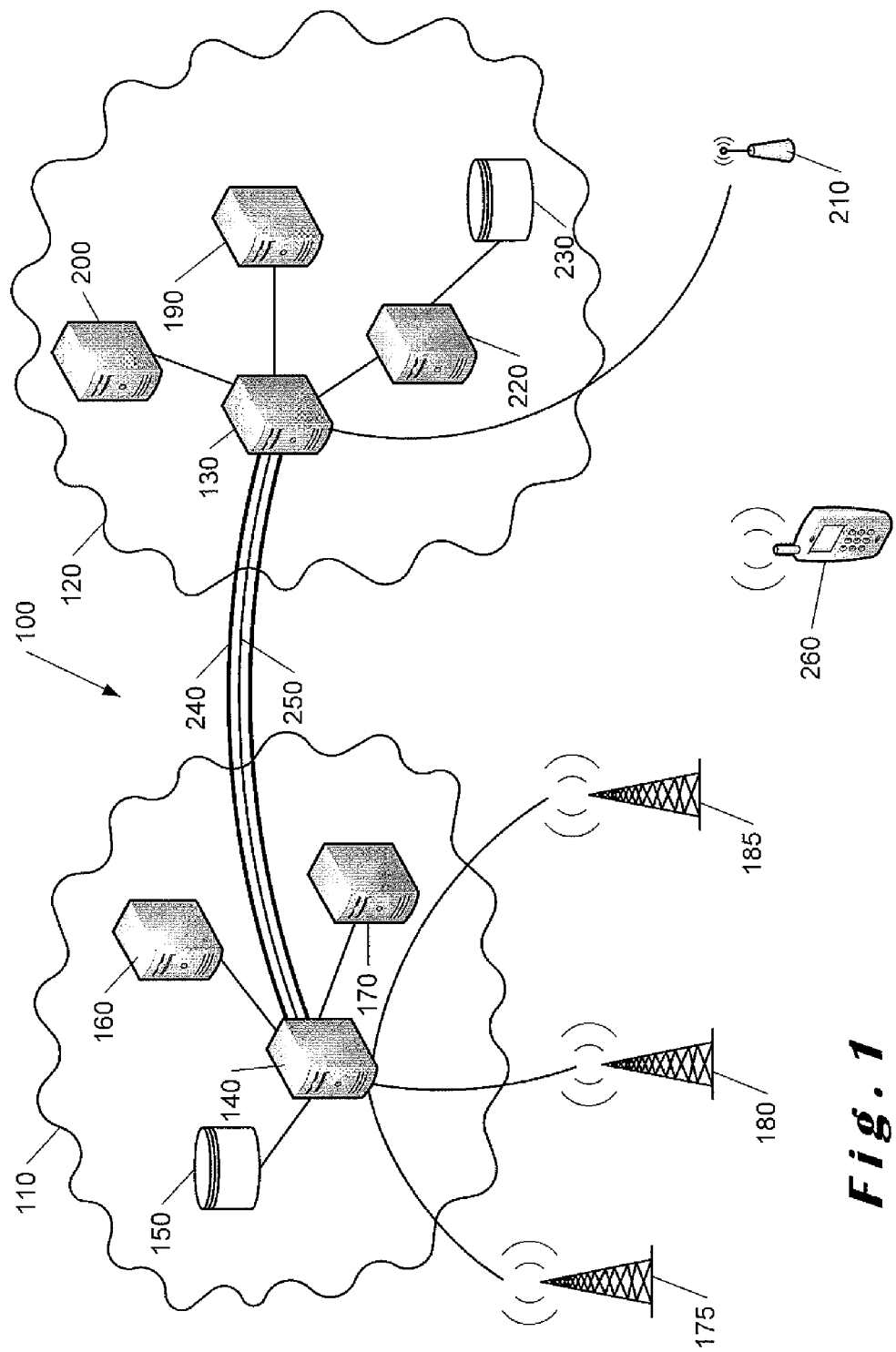
FIG. 1 illustrates a communications system in which a call can be transferred between an IP network and a GSM network.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Switched circuit telephone networks use a signalling protocol called Common Channel Signalling System #7(more commonly called SS7 or C7). In the public switched telephone network (PSTN), signalling end points send and receive SS7 signalling messages. There are three kinds of signalling end points: Service Switch Point (SSP or central office switch); Signal Transfer Point (STP); Service Control Point (SCP).

In SS7 networks, Integrated Services Digital Network (ISDN) User Part (ISUP), signalling messages are used to setup, manage and release trunk circuits that carry voice calls between central office switches. ISUP messages also carry caller identification (ID) information, such as, telephone number and name of a calling party. ISUP is used for both ISDN and non-ISDN calls between central office switches.

Transaction Capabilities Application Part (TCAP) signalling messages support telephony services, such as toll-free (freephone), calling card, local number portability and mobile (wireless) roaming and authentication services. Mobile services are enabled by information carried in the Mobile Application Part (MAP) of a TCAP message. TCAP supports non-circuit related information exchange between signalling points using the Signalling Connection Control Part (SCCP) connectionless service.

Voice over Internet Protocol (VoIP) networks carry SS7-over-IP using protocols defined by Signalling Transport (SigTran) working group of the Internet Engineering Task Force (IETF), the international organisation responsible for recommending Internet standards. The SigTran protocols support the stringent requirements for SS7/C7 signalling as defined by International Telecommunication Union.

In IP telephony networks, signalling information is exchanged between the following functional elements: the media gateway (MG), the media gateway controller (MGC), and the signalling gateway.

The media gateway terminates voice calls on inter-switch trunks from the public switched telephone network, compresses and packetizes the voice data, and delivers compressed voice packets to the IP network. For voice calls originating in an IP network, the media gateway performs these functions in reverse order. For ISDN calls from the PSTN, Q.931 signalling information is transported from the media gateway to the media gateway controller for call processing.

The media gateway controller handles the registration and management of resources at the media gateway(s) and exchanges ISUP messages with central office switches via a signalling gateway. Because vendors of media gateway controllers often use off-the-shelf computer platforms, a media gateway controller is sometimes called a "softswitch".

The signalling gateway provides transparent interworking of signalling between switched circuit and IP networks and may terminate SS7 signalling or translate and relay messages over an IP network to a media gateway controller or another signalling gateway. Because of its critical role in integrated voice networks, signalling gateways are often deployed in groups of two or more to ensure high availability.

Media gateways, signalling gateways or media gateway controllers ("softswitch") may be separate physical devices or integrated in any combination.

Although the present invention is described with reference to a dual mode terminal connectable to a GSM or IP network, it will be appreciated that the terminal may be connectable to more than two types of networks and can therefore comprise a multi-mode terminal. In addition, the term "mobile terminal" as used herein is intended to cover dual mode as well as multi-mode terminals.

In FIG. 1, a communications system 100 is shown which comprises a PSTN 110, an IP network 120, such as the Internet, and a dual mode terminal 260. The dual mode terminal 260 may be any suitable multi-mode device, for example, a smart phone, a tablet or any other portable device having the necessary connectivity. Although the terminal 260 is described as a dual mode terminal, it will be appreciated that it may be a multi-mode terminal that operates on more than two modes.

The PSTN 110 is a public land mobile network (PLMN) comprising a mobile switching centre (MSC) 140 connected to a home location register (HLR) 150, a SCP 160, and a STP 170. It will be appreciated that although only one of these elements is shown, they may be doubled for redundancy, as customary in this technical domain. The PSTN 110 also comprises base stations 175, 180, 185, each base station providing coverage for a mobile telephony cell.

The IP network 120 comprises a routing server 190, which in this particular embodiment is a signal initiation protocol (SIP) server, and a MG 130 connected with a MGC 200. This MGC 200 is identified with a signalling point code, so that it can exchange call signalling information via the STP 170 using SS7 ISUP signalling. The MG 130 is connected, over the IP network 120, with a wireless LAN (WLAN) router 210 providing coverage to a wireless LAN, and with a voice call continuity (VCC) server 220. The VCC server 220 has a Call in Progress Table (CPT) 230. Just like the STP 170, the MG 130 and MGC 200 can be doubled for redundancy.

In this embodiment, the MSC 140 and MG 130 are connected over an E1 or T1 trunk 240. Within this trunk 240, an SS7 ISUP signalling channel 250 provides signalling communication between the STP 170 and the MGC 200. The dual mode terminal 260 comprises both a mobile telephony transceiver, such as, for example a GSM transceiver, a CDMA transceiver, a PDC transceiver, a PDMA transceiver, an UMTS transceiver, or a CDMA2000 transceiver, and, in this embodiment, a WLAN transceiver, such as an IEEE 802.11 (Wi-Fi™) transceiver, allowing the dual mode terminal 260 to independently connect to both the PSTN 110 and the IP network 120.

The dual mode terminal 260 further comprises an SIP client, which can be implemented by a generic programmable data processor running a specific computer program. The dual mode terminal 260 has a unique identifier, which is stored in the HLR 150 as belonging to a subscriber of an FMC service.

Figure 2:
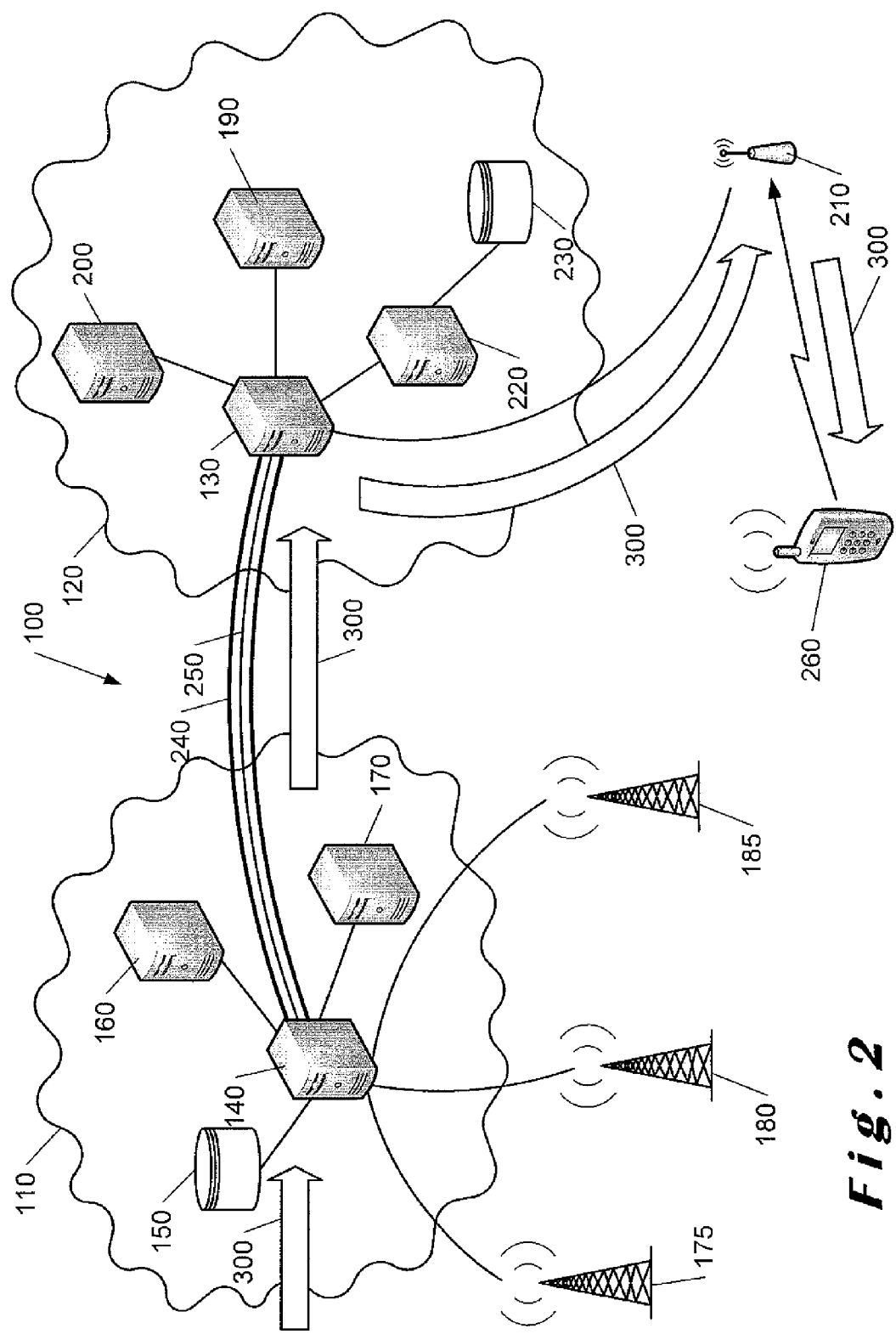
FIG. 2 illustrates the routing of an incoming call over the IP network when the dual mode terminal is connected to the IP network in the communications system shown in FIG. 1.
Figure 3:
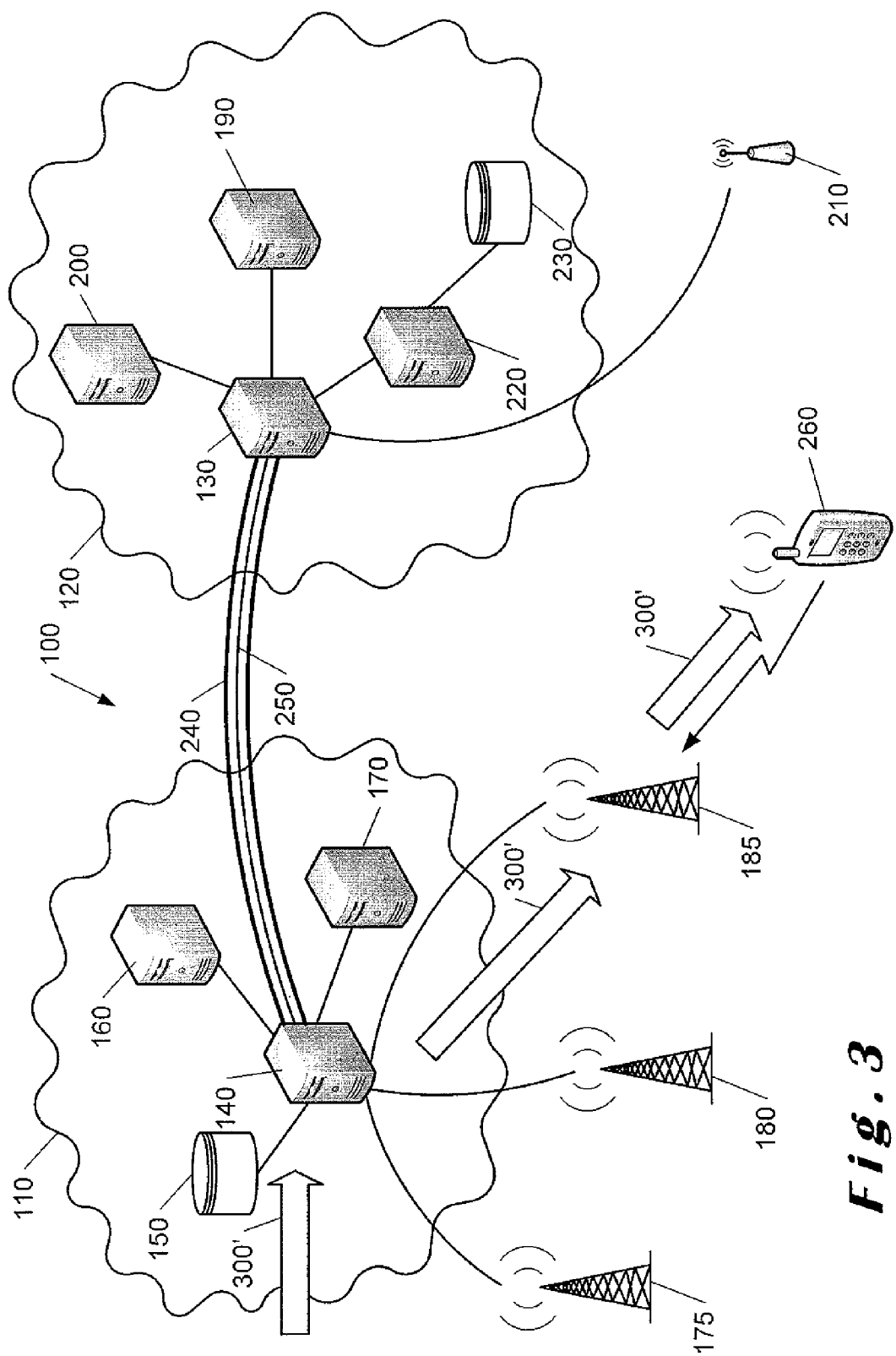
FIG. 3 illustrates the routing of an incoming call over the PSTN to the dual mode network when the dual mode terminal is not connected to the IP network or does not reply in the communications system shown in FIG. 1.

FIGS. 2 and 3 are similar to FIG. 1 and illustrate the routing of an incoming call 300 to a dual mode terminal 260. In FIG. 2, the connection is made via the IP network 120 and in FIG. 3, the connection does not use the IP network 120.

When an incoming call 300 is received over the PSTN 110, the MSC 140 checks whether the unique identifier associated with the dual mode terminal 260 is registered in the HLR 150 as belonging to a subscriber of this FMC service. If this is the case, the MSC 140 refers the call to the SCP 160, which applies a forced routing routine over the STP 170. The STP 170 sends a connection request via the SS7 ISUP signalling channel to the MGC 200, which then interrogates the routing server 190.

If the dual mode terminal 260 is connected to the IP network 120, its SIP client will have sent a registration message to the routing server 190. If the dual mode terminal 260 is still registered at the routing server 190 when the MGC 200 queries the routing server 190, the routing server 190 will thus transmit the SIP "Invite" message to the dual mode terminal

260, and send an SIP message "Trying" back to the MGC 200. If it is available, the dual mode terminal 260 will then reply to the SIP "Invite" message of the routing server 190 with an SIP "Trying" message first, and then with SIP messages "Ringing" and/or "Early Media", and "OK". These two or three messages, for example, "Ringing" and "OK" or "Early Media" and "OK" referring to two messages, and, "Ringing" and "Early Media" and "OK" referring to three messages, are transmitted by the routing server 190 to the MGC 200 as a positive answer to its query. The MGC 200 translates them and passes them to the STP 170 over the SS7 ISUP channel 250, accepting the connection request from the STP 170, and setting up the incoming call, as indicated by 300, to be routed to the dual mode terminal 12630 as a VoIP call over the IP network 120 to the dual mode terminal 260 via the WLAN router 210.

The MGC 200 also sends an SIP "ACK" acknowledgment message to the routing server 190, which will transmit it to the dual mode terminal 260. If the dual mode terminal 260 is busy, it will reply to the SIP "Invite" message of the routing server 190 with an SIP message with a "Busy" message, which will then be transmitted to the MGC 200, which will translate it as an SS7 ISUP message "REL" with release cause code "Busy" to the STP 170. The STP 170 will then acknowledge the busy signal towards the MGC 200, which will translate it as an SIP "ACK" message to the dual mode terminal 260 over the routing server 190.

If the dual mode terminal 260 is not (or no longer) registered at the routing server 190, the routing server 190 will return, after its SIP "Trying" message, a negative answer to the query from the MGC 200 in the form of an SIP message with a failure code. The MGC 200 will then, in turn, answer the connection request with an SS7 ISUP "REL" message. The STP 170 will then acknowledge this with an SS7 ISUP "RLC" message towards the MGC 200, which will translate it as an SIP "ACK" message to the routing server 190.

If the dual mode terminal 260, although connected to the IP network 120, does not reply to repeated SIP "Invite" messages sent by the routing server 190, after a timeout, the routing server 190 will send an SIP "Cancel" message to the dual mode terminal 260, and an SIP "Request Timeout" message to the MGC 200. The MGC 200 will then answer the connection request with an SS7 ISUP "REL" message. The STP 170 will then acknowledge this with an SS7 ISUP "RLC" message towards the MGC 200, which will translate it as an SIP "ACK" message to the routing server 190. In both cases, the incoming call 300 will then be routed to the dual mode terminal 260 over the PSTN 110, without entering the IP network 120 as shown by 300' in FIG. 3.

Once there is an ongoing call 300 (FIG. 2) over the IP network 120 to the dual mode terminal 260, the dual mode terminal 260 will monitor the connection quality, for instance, by monitoring packet losses, wireless signal strength, current jitter and/or jitter buffer size, etc., and when the connection quality falls below a predetermined threshold, handover may be initiated from one network to another, for example, from an IP network to a mobile telecommunications network and vice versa. Handover is described in more detail below and is platform-centric, that is, controlled by the telecommunications platform on which the dual mode terminal 260 is operating.

Figure 4A:
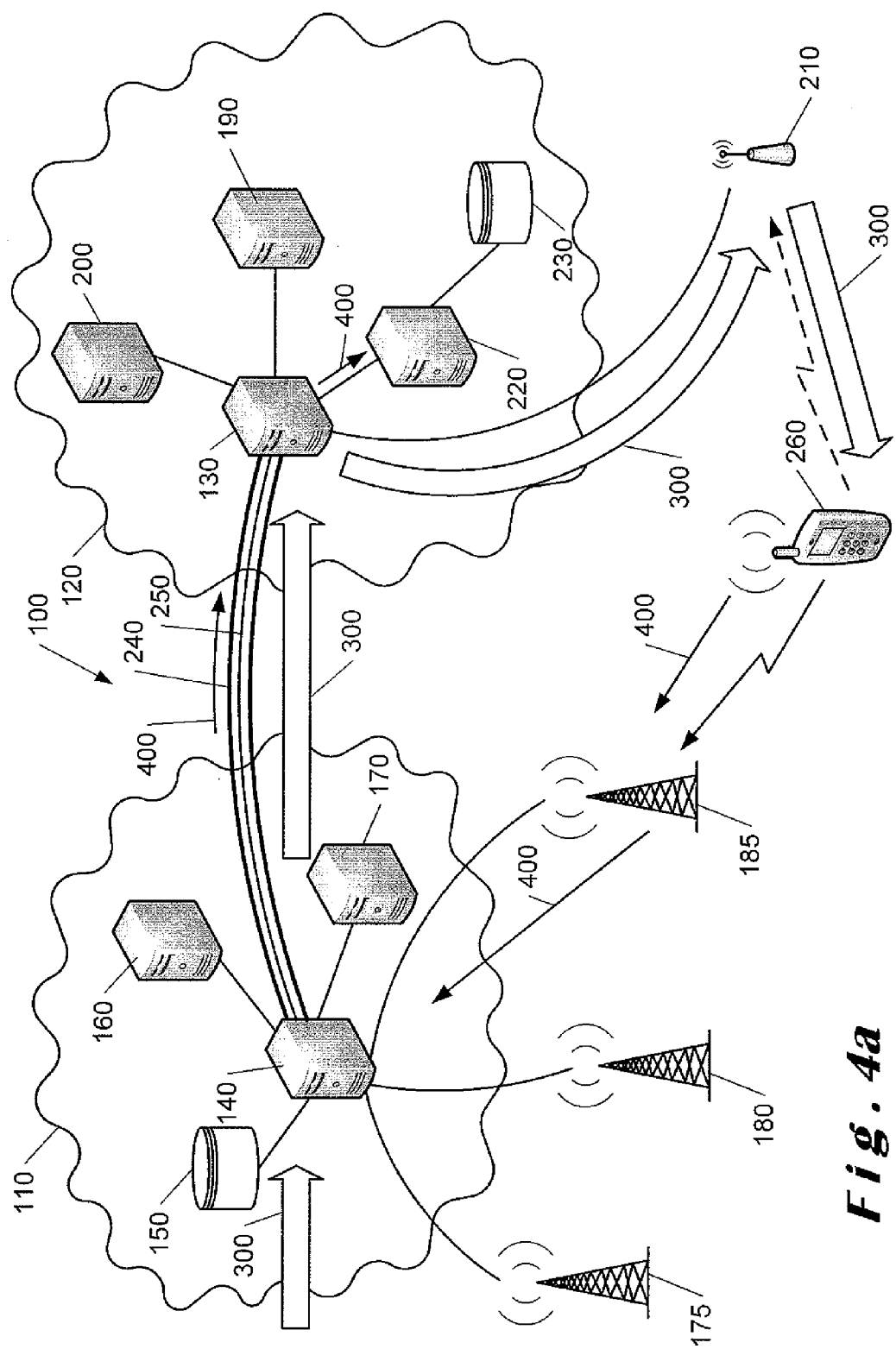
FIGS. 4a and 4b illustrate re-routing over the PSTN of a call in progress if the connection of the dual mode terminal to the IP network is impaired.

FIG. 4*a* is similar to FIG. 2 and illustrates part of the handover sequence. If the connection of the dual mode terminal 260 with the IP network 120 is significantly impaired, for instance, because the dual mode terminal 260 moves towards the outer range of the WLAN router 210, the SIP client in the dual mode terminal 260 will initiate a continuity call 400 over a PSTN to the VCC server 220, using a VCC service number.

This VCC service number may be selected from a table of available VCC service numbers, depending on location, which can be determined from global positioning data and/or the mobile network code (MNC) and/or mobile country code (MCC) of the PLMN base station 185 to which the dual mode terminal 260 is connected. Thus, if this MNC corresponds to that of a "home" PLMN to which the dual mode terminal 260 is subscribed, the selected VCC service number will usually be a specific short number. If however, the MNC and/or MCC does not correspond to that of a "home" PLMN, indicating that the dual mode terminal 260 is connected over a third-party PLMN, the selected VCC service number may be a generic number, possibly a toll-free number which will be routed over another VoIP trunk. The VCC service number may even have a different country prefix, if the MCC also differs from that of the "home" PLMN, indicating that the dual mode terminal 260 is roaming abroad, which makes the selection of a cost-effective VCC service number even more important. Although in the illustrated embodiment the continuity call 400 is routed over the same PSTN 110 that the incoming call 300 originated from, it may thus be routed over a different telephone network, and enter the IP network over a different media gateway.

Figure 4B:
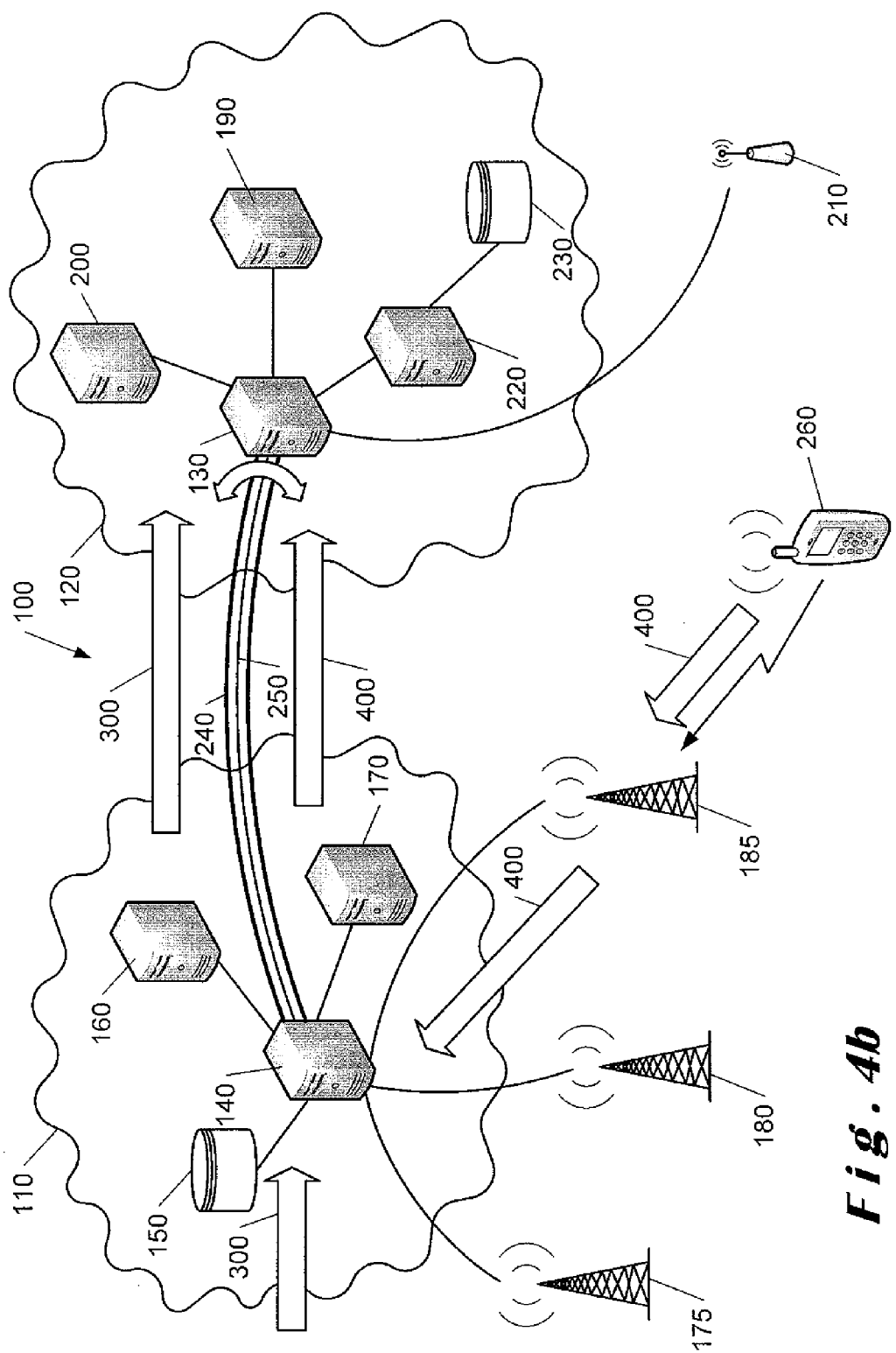

When the VCC server 220 receives a continuity call 400 directed to one such VCC service number and originating from a subscriber dual mode terminal 260, the VCC server 220 will look up in the CPT 230 whether there is an ongoing call 300 with this dual mode terminal over the IP network 120. If the answer is positive, the VCC server 220 will swap the continuity call 400 with the IP network of the ongoing call 300, and then close the IP network leg. As illustrated in FIG. 4*b*, this will complete handover of the ongoing call 300 from the IP network 120 to the PSTN 110.

While only examples of incoming calls towards the dual mode terminal 260 have been illustrated, it must be understood that the dual mode terminal 260 may itself also initiate outgoing calls, both over its mobile telephony and wireless transceivers. In particular, the call handover illustrated in FIGS. 4*a* and 4*b* may be performed independently of whether the ongoing call 300 is an incoming or outgoing call. It must also be understood that, while only calls between the dual mode terminal 260 and a PSTN subscriber have been illustrated, the dual mode terminal 260 may also send and receive calls to and from IP network subscribers.

Although in this particular embodiment of the invention, only a client-originated handover has been described, the handover can also be performed by the VCC server with a continuity call originating from the MGC to the dual-mode terminal as instructed via signalling information transmitted by the VCC Server. It must also be understood that, although the MG 130 and MGC 200 are illustrated here as two separate entities, they may be combined into a single unit.

It must be also understood that, although the present invention mainly relates to voice calls, other mobile services, such as texting and voicemail, may also be accessible through both the PSTN 110 and the IP network 120.

FIG. 5 illustrates a block diagram of a communications system 500 in accordance with the present invention. The architecture 500 comprises a MMC architecture 505, a fixed network 510, and a MSC/HLR server 515. MMC is an offshoot of FMC in which a dual mode terminal operates with specialised software and hardware for connecting voice calls and other applications via a voice-over-WLAN (VoWLAN) and/or through a cellular service. WLAN is used to route calls via the internet and uses a wireless carrier network if the WLAN is not present. It differs from FMC in that a ranking is put on the connections with WLAN being the primary connection and the wireless carrier network as the secondary connection.

It will be appreciated that the present invention is not limited to WLAN and can be 3G, EDGE or any other IP network. The term Wi-Fi as used herein relates to connection to any suitable IP network including 3G, EDGE, VoWLAN etc.

The architecture 505 comprises a SIP core 520 connected to MMC VCC and voice quality control (VQC) server 525. First and second MGs 530, 535 are provided through which connections to the fixed network 510 and MSC/HLR server 515 are made from the SIP core 520. The MMC VCC and VQC server 525 is connectable to a public Wi-Fi zone (public zone) 540 and controlled Wi-Fi zone (hotspots) 545.

The fixed network 510 is connected to a first PSTN 550 and the MSC/HLR server 515 is connected to a second PSTN 555. The first and second PSTNs 550, 555 may be connectable to one another or, in one embodiment, may be the same PSTN. The MSC/HLR server 515 is also connected to a mobile radio access network (RAN) 560 via a mobile MSC/HLR server 565. The MSC/HLR server 515 is also connected to a mobile voicemail system 570.

A dual mode terminal 575 is connectable to the public zone 540, hotspots 545 and the mobile RAN 560. The dual mode terminal 575, for example, a smart phone handset, has a MMC client application that controls the network connection so that the priority is the Wi-Fi zones, the public zone 540 and hotspots 545, with the mobile RAN 560 only being used when Wi-Fi is not available.

The MMC architecture 510 supports the highest possible voice call quality on the most appropriate network in accordance with availability. There are two main elements of the architecture 505, namely, a MMC platform corresponding to the SIP core 520 and the MMC VCC and VQC server 525, and a MMC client (not shown) that is provided on the dual mode terminal 575.

Current technology implemented on smart phone handsets together with Wi-Fi performance, voice call quality (VCQ) provided by Wi-Fi calls (VoIP via Wi-Fi) out-perform average GSM call quality. A high definition codec on the MMC client enables this high VCQ as will be described in more detail below. In accordance with the present invention, when Wi-Fi VCQ in a Wi-Fi call drops below the quality of an average GSM call, handover is initiated between the Wi-Fi call and a GSM cellular network.

Figure 6:
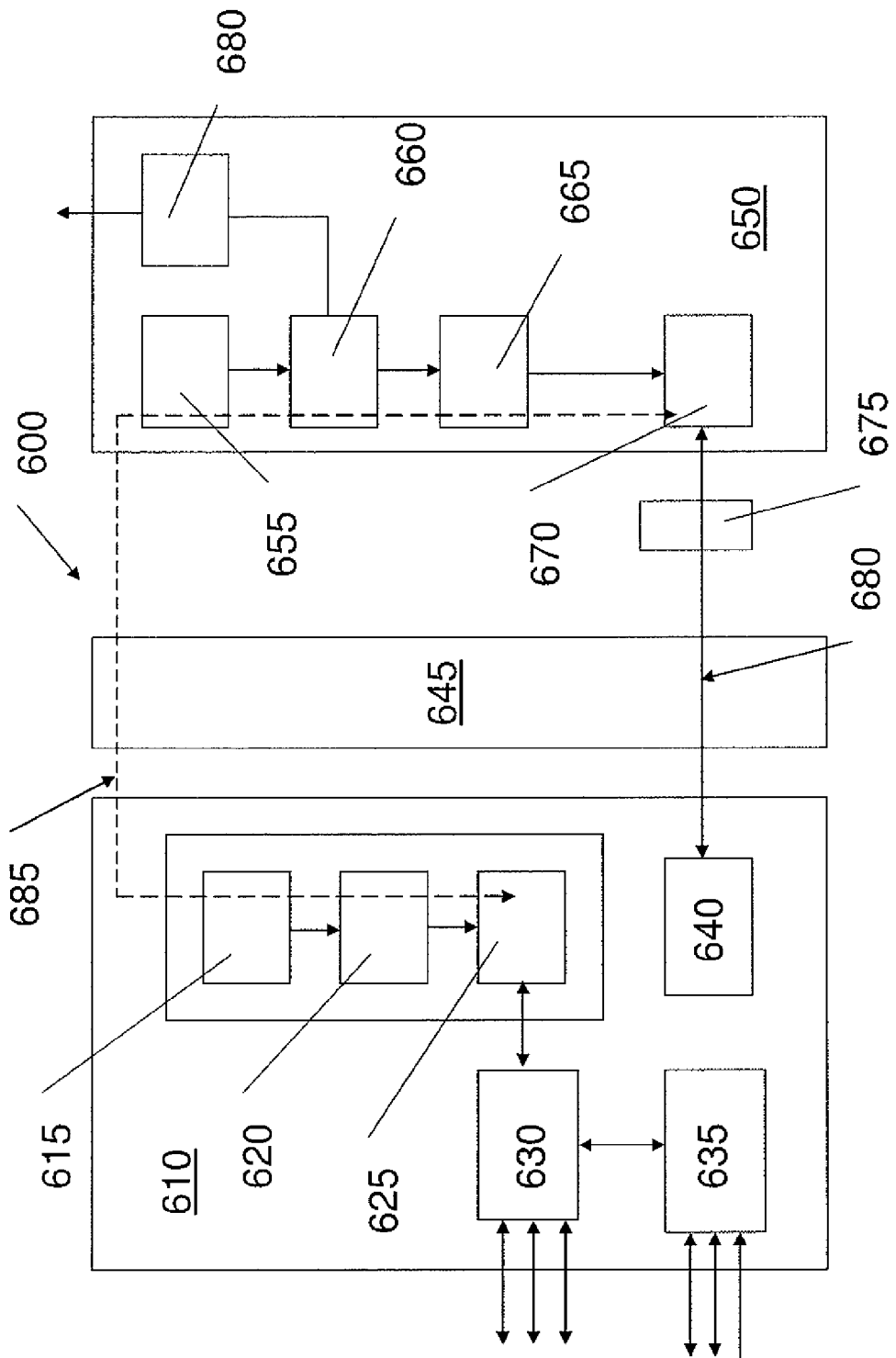
FIG. 6 illustrates MMC voice call quality control architecture in accordance with the present invention.

FIG. 6 illustrates a system 600 for MMC VCQ control. The system 600 comprises a MMC platform 610 that includes a voice call continuity (VCC) module 615, a voice quality control (VQC) module 620, and a call handler module 625. The VCC module 615 controls the handover process between Wi-Fi and GSM. The VQC module 620 analyses the voice quality based upon real-time protocol (RTP) voice traffic and real-time transport control protocol (RTCP).

RTP defines a standardised packet for delivering audio and video over IP networks and is used in all communications systems that utilise streaming media including telephony, video teleconferencing applications and web-based push-to-talk features. RTP is used in conjunction with RTCP. Whilst RTP carries media streams, such as, audio and video, RTCP is used to monitor transmission statistics and quality of service (QoS) and to assist in the synchronisation of multiple streams. In addition, RTP is one of the technical foundations of VoIP and is often used in conjunction with the signalling protocol for setting up connections across the network.

The call handler module 625 communicates with first and second session border controllers (SBC) 630, 640. First SBC 630 interfaces with the SIP trunk (not shown) and second SBC 640 interfaces with a SIP stack 670 in a dual mode terminal 650 as will be described in more detail below. A first MG 635 also interfaces with SBC 630 and through which connections are made to a PSTN and to a mobile network operator (MNO) (both not shown). The first MG 635 also manages GSM call handover. Public internet 645 is provided between the MMC platform 610 and the dual mode terminal 650.

In the dual mobile terminal 650, a Wi-Fi transceiver 655 and a GSM transceiver 680 are provided. Wi-Fi transceiver 655 is connected to a VCC module 660, a VQC module 665 and the SIP stack 670. The VCC module 660 corresponds to the VCC module 615 in the MMC platform 610. The VQC module 665 analyses the voice quality based upon RTCP and Wi-Fi coverage. The SIP stack 670 is optimised in accordance with the particular MMC platform 610 with which the dual mode terminal 650 is associated, and is connectable via Wi-Fi, as indicated by transceiver 675, to provide SIP signalling (SIP SIG) to the SBC 640 associated with the MMC platform 610. Although Wi-Fi transceiver 655 and Wi-Fi transceiver 675 are shown as two separate modules, it will be appreciated that they can be implemented as a single transceiver module.

In addition, although transceiver 675 is shown in FIG. 6 as being located outside of the mobile terminal 650 for clarity, but it will be appreciated that it is located within the body of the mobile terminal 650.

VCQ is managed by integrated MMC components to provide optimal end-to-end voice call quality. In accordance with the present invention, this is achieved by the VQC module 620 and VCC module 615 on the MMC platform 610 and the VQC module 665 and VCC module 655 on the dual mode terminal 650. The VQC modules 620, 665 check for voice call quality indicators for all in progress IP-based voice calls. These checks may include:

1) correct exchanges of the SIP signalling information;
2) RTP traffic presence, that is, RTP carrying VoIP traffic;
3) end-to-end IP packet delay;
4) delay jitter, that is, variations in the IP packet delay;
5) IP packet drops, that is, loss of RTP information;
6) Wi-Fi coverage level (including availability, access, signal strength, etc.); and
7) GSM network coverage level (including availability, access, etc.).

VCC modules 615 and 655 together perform the handover of a call that is in progress to another network when required. The handover runs in the background and is transparent to the subscriber or user of the dual mode terminal 650.

The dual mode terminal 650 may initiate a Wi-Fi quality call initiation process every time it connects to a Wi-Fi hotspot. This will depend on whether the dual mode terminal 650 is already connected to a Wi-Fi call, whether the subscriber preferences allow this etc. In this process, the dual mode terminal 650 verifies the VCQ, once connected to Wi-Fi, by launching a voice test call. This test call is carried out in the background and the subscriber or user of the dual mode terminal 650 is unaware that it is being carried out. If a predetermined minimum quality is not achieved in the test call, the dual mode handset 650 will not be permitted to handle calls over Wi-Fi.

Based on historical data the MMC platform 610 is able to predict when call handover needs to be initiated to avoid any VCQ disturbance to the subscriber or user of the dual mode terminal 650. This prediction is based on an algorithm that embeds a mix of parameters that impact quality as well as external subscriber-related variables, such as, terminal hardware, software, and Wi-Fi hotspot. The conditions at which handover is to be initiated are determined in accordance with the MMC service provider, during commissioning of the service, and/or a slider provided on the dual mode terminal 650, which is user activated and provided to adjust sensitivity. These conditions can be set in accordance with personal preferences or specific market conditions.

As described above, a seamless handover process is of utmost importance for the MMC service and is required for cost optimisation, that is, when the Wi-Fi call is more cost effective than a GSM call, safeguard the quality of the voice call over and the continuity of the voice call outside Wi-Fi hotspot coverage. The seamless handover process can be initiated either by the dual mode terminal or by the MMC VCC server and is implemented without intervention by the subscriber or user of the dual mode terminal.

Figure 7:
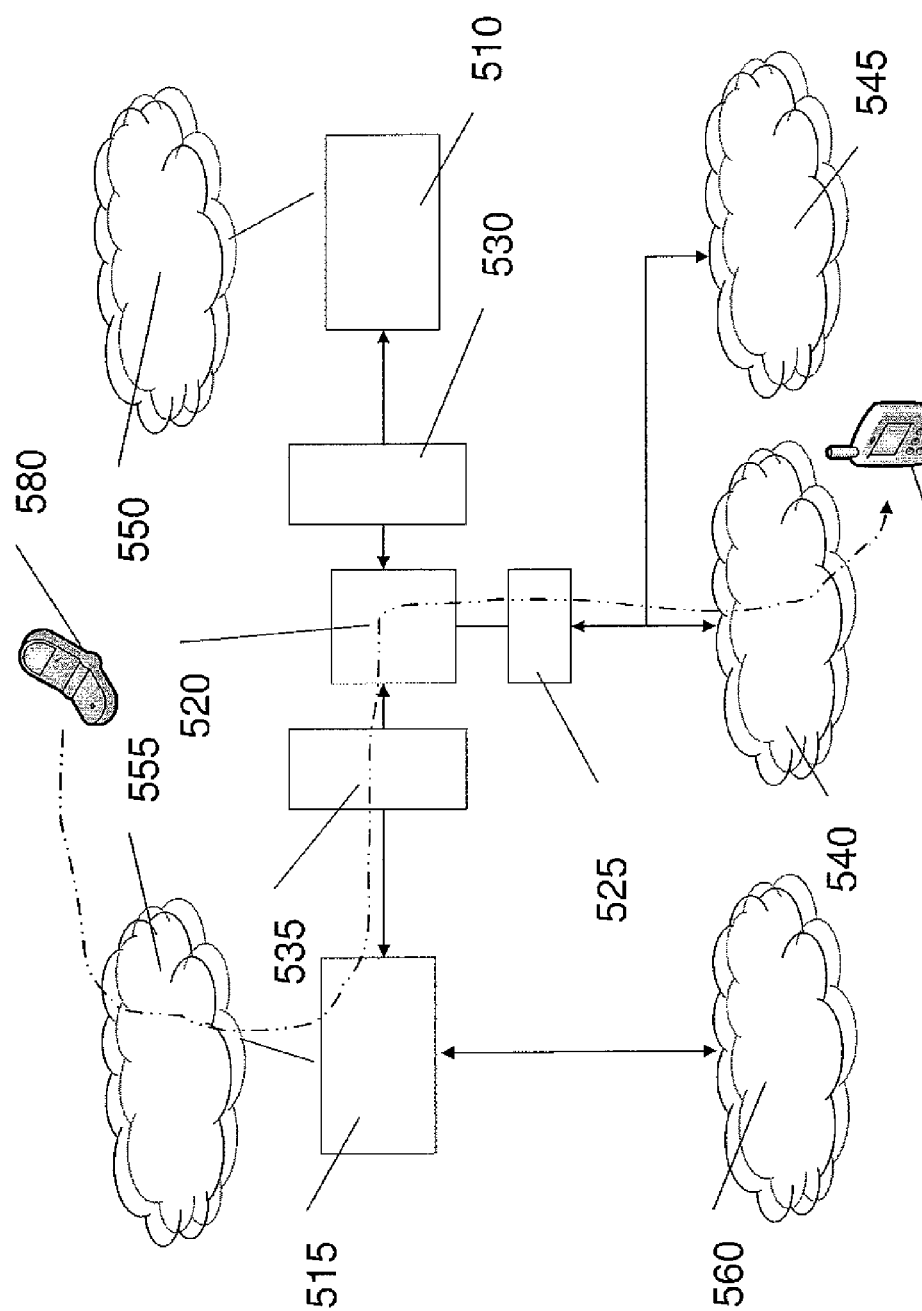
FIG. 7 illustrates an incoming call for a dual mode terminal where the call is routed via an IP network.

FIG. 7 is similar to FIG. 5 and the same reference numerals are used for identical components. In FIG. 7, a user 580 making a call is shown. It will be appreciated that the user may be another dual mode terminal, a fixed telephone or a mobile telephone. An incoming Wi-Fi call is shown by a dot-dash line passing between user 580 and the dual mode terminal 575. The originating call connects with the PSTN 555 and is passed to the MSC/HLR module 515 where it is directed through the media gateway 530 to the SIP core 520, into the VQC server 525, and through the public Wi-Fi zone 540 to the dual mode terminal 575. The VQC server 525 determines that the voice call quality in the public Wi-Fi zone 540 meets the minimum predetermined level and passes the call to the dual mode terminal via the public Wi-Fi zone 540. The dual mode terminal 575 is therefore connected on a VoIP call with the user 580.

Figure 8:
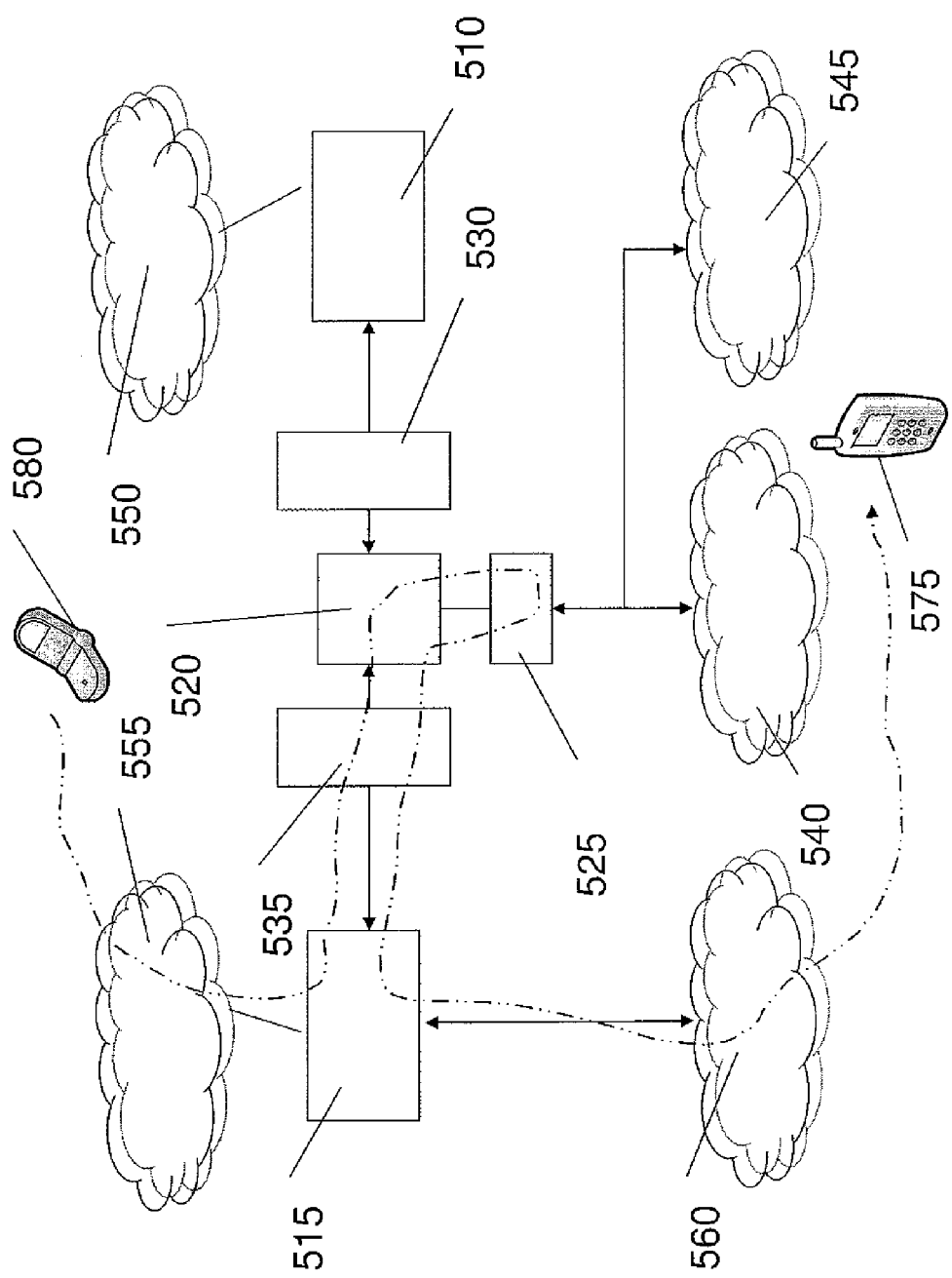
FIG. 8 illustrates an incoming call for a dual mode terminal after handover on GSM.

FIG. 8 is similar to FIG. 7 and illustrates an incoming Wi-Fi call after handover. In a similar way to FIG. 7, the incoming Wi-Fi call is illustrated by a dot-dash line passing between the user 580 and the dual mode terminal 575. However, in this case, the call reaches the VQC server 525 but the voice call quality in the public Wi-Fi zone 540 does not meet the predetermined minimum level. As a result, the VQC server 525 directs the call back through the SIP core 520 which passes it back through the media gateway 530 to the MSC/HLR module 515 and into the mobile RAN 560 for transmission to the dual mode terminal 575 via a GSM network. The VoIP call therefore becomes a GSM call and the dual mode terminal 575 is no longer connected to the public Wi-Fi zone 540.

Figure 9:
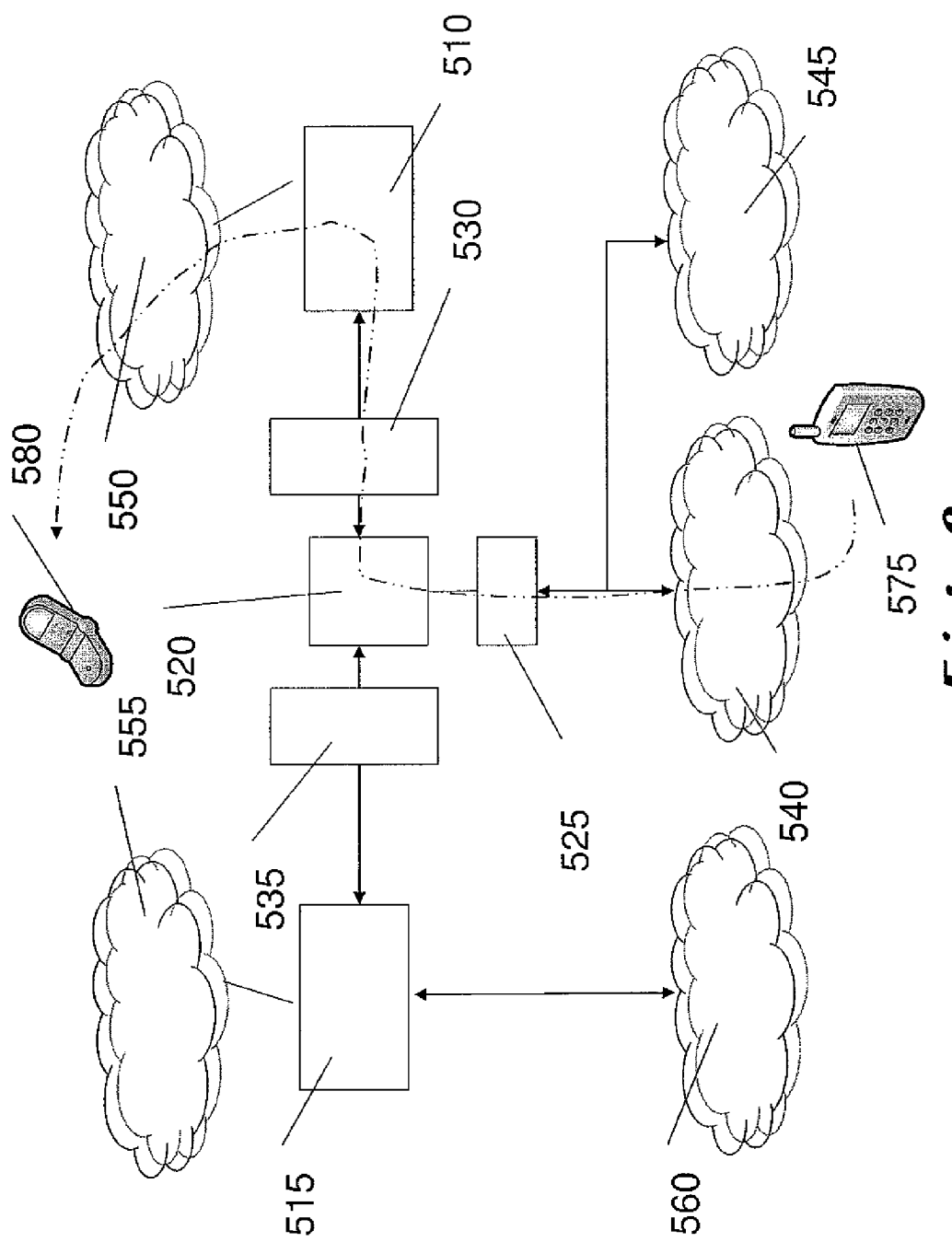
FIG. 9 illustrates an outgoing call from a dual mode terminal via an IP network.
Figure 10:
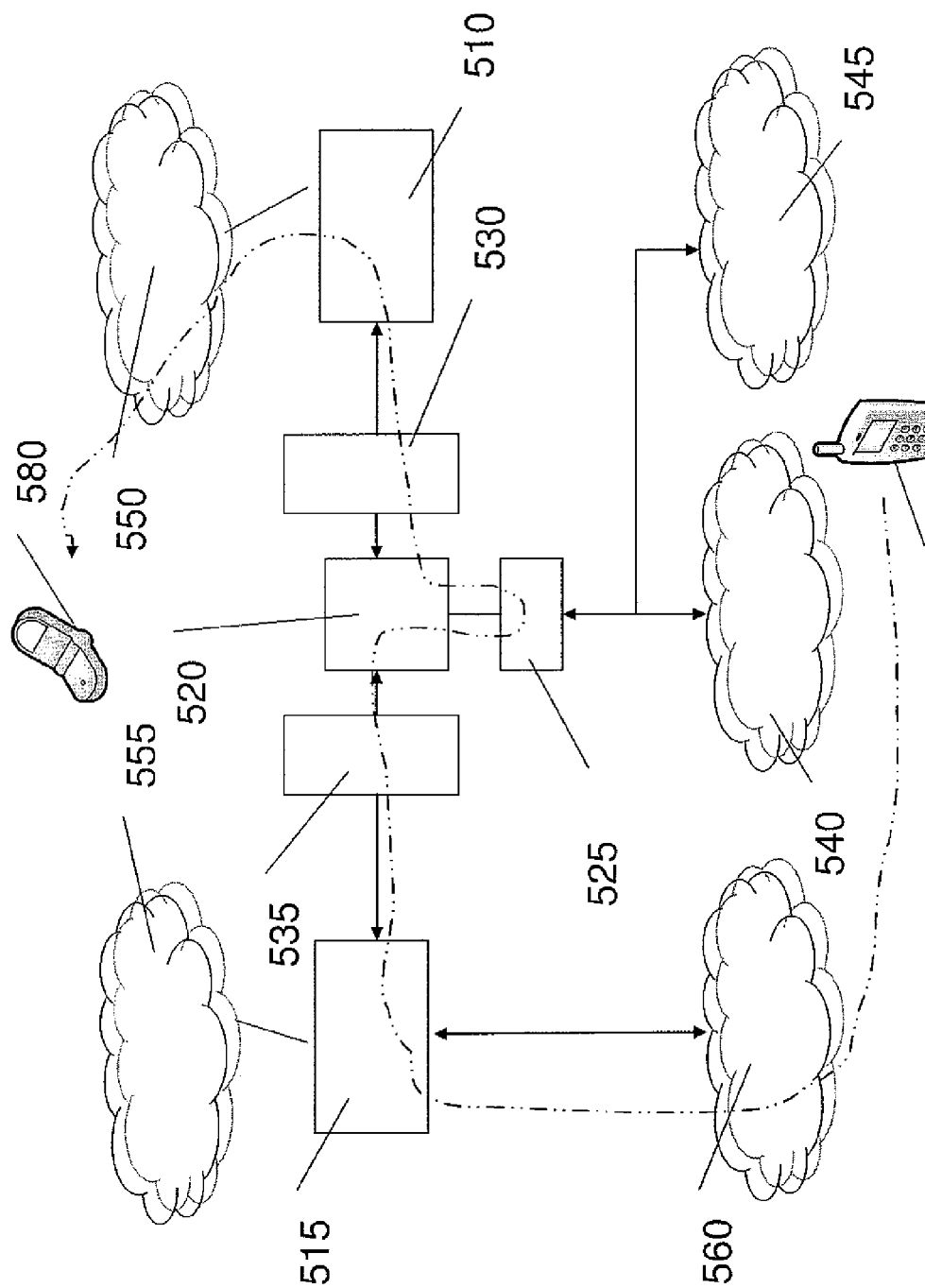
FIG. 10 illustrates an outgoing call from a dual mode terminal after handover on GSM.

FIGS. 9 and 10 are similar to FIGS. 7 and 8 and illustrate outgoing calls before and after handover respectively. In FIG. 9, the dual mode terminal 575 initiates a Wi-Fi call in accordance with MMC protocol. The Wi-Fi call meets the minimum call quality and is directed to the VQC server 525, to the SIP core 520, through first MG 530 to the fixed network 510 and through the PSTN 550 to the user 580 as indicated by a dot-dash line.

In FIG. 10, the outgoing call is routed via the mobile RAN 560 to the MSC/HLR module 515 through media gateway 515, SIP core 520 and into the VQC server 525. As the call does not meet the minimum level for Wi-Fi, it is directed back to the SIP core 520, through the first MG 530 to the fixed network 510 and into the PSTN 550 and onto the user 580 as shown by a dot-dash line.

Handover between networks has been described with reference to FIGS. 4a and 4b above.

Wi-Fi-to-GSM handover functionality is supported by ISUP voice trunks to which the first MG 635 (FIG. 6) in the MMC platform 610 connects. GSM-to-Wi-Fi handover functionality is more advanced and may be supported by a GSM network linked to the MMC platform where mobile calls are effectively "anchored" into the voice platform. This means that the platform 610 is aware of all mobile calls in progress on the linked GSM network.

Mobile call anchoring onto the MMC voice platform can be enabled by physically anchoring all mobile calls in progress by accepting all incoming mobile calls and routing them back to the MSC module or by providing anchoring using more advanced SS7 signalling. In the former case, the anchoring can be achieved using existing standard ISUP voice trunks but as all mobile calls need to be routed over the MMC voice platform, infrastructure costs may be significantly increased. In the latter case, anchoring is achieved by the integration of intelligent network (IN) platforms which supports intelligent network application part (INAP) signalling protocol that enables advanced handling of mobile calls.

IN is a network architecture that can be used for both fixed and mobile telecommunications networks. It is based on SS7 protocol between telephone switching centres and other network nodes owned by network operators. The architecture allows operators to differentiate themselves by providing value-added services in addition to standard telecommunications services, for example, PSTN, ISDN and GSM services. The intelligence is provided by network nodes on the service layer of the core network which is different to the switching layer in the core network. Typically, the IN nodes are owned by telecommunications operators. INAP is a signalling protocol that forms part of the SS7 protocol suite and is typically layered on top of TCAP. It can be considered as being logic for controlling telecommunications services migrated from traditional switching points to computer-based service independent platforms.

Figure 11:
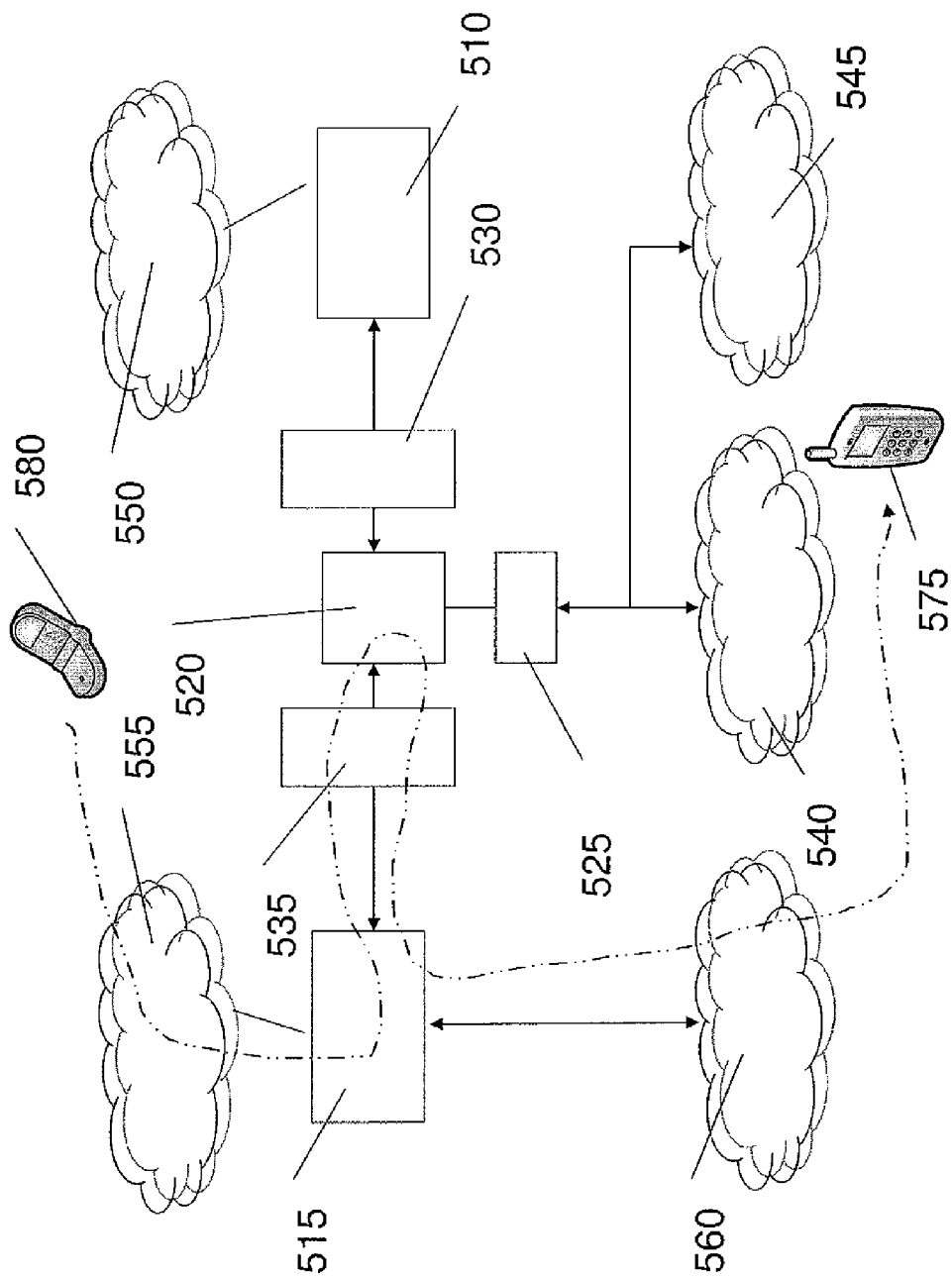
FIG. 11 is similar to FIG. 7 and illustrates advanced ISUP anchoring.

FIG. 11 is similar to FIGS. 9 and 10 and illustrates anchoring using existing standard ISUP voice trunks. Here, a call originating from the fixed or mobile user 580 is connected to the PSTN 555 and passes to the MSC/HLR module 515. From the MSC/HLR module 515, the call passes through the second MG 535 to the SIP core 520. The call is redirected back to the MSC/HLR module 515 as the dual mode terminal 575 is not available over an IP network, that is, via Wi-Fi. The call is anchored via dual call legs over the voice trunk and is connected to the mobile RAN 560 to the dual mode terminal 575 via GSM. The path of the call is shown by a dot-dash line. Once the dual mode terminal 575 becomes available via Wi-Fi, handover from GSM to Wi-Fi will be initiated provided the minimum call quality requirements are met.

Figure 12:
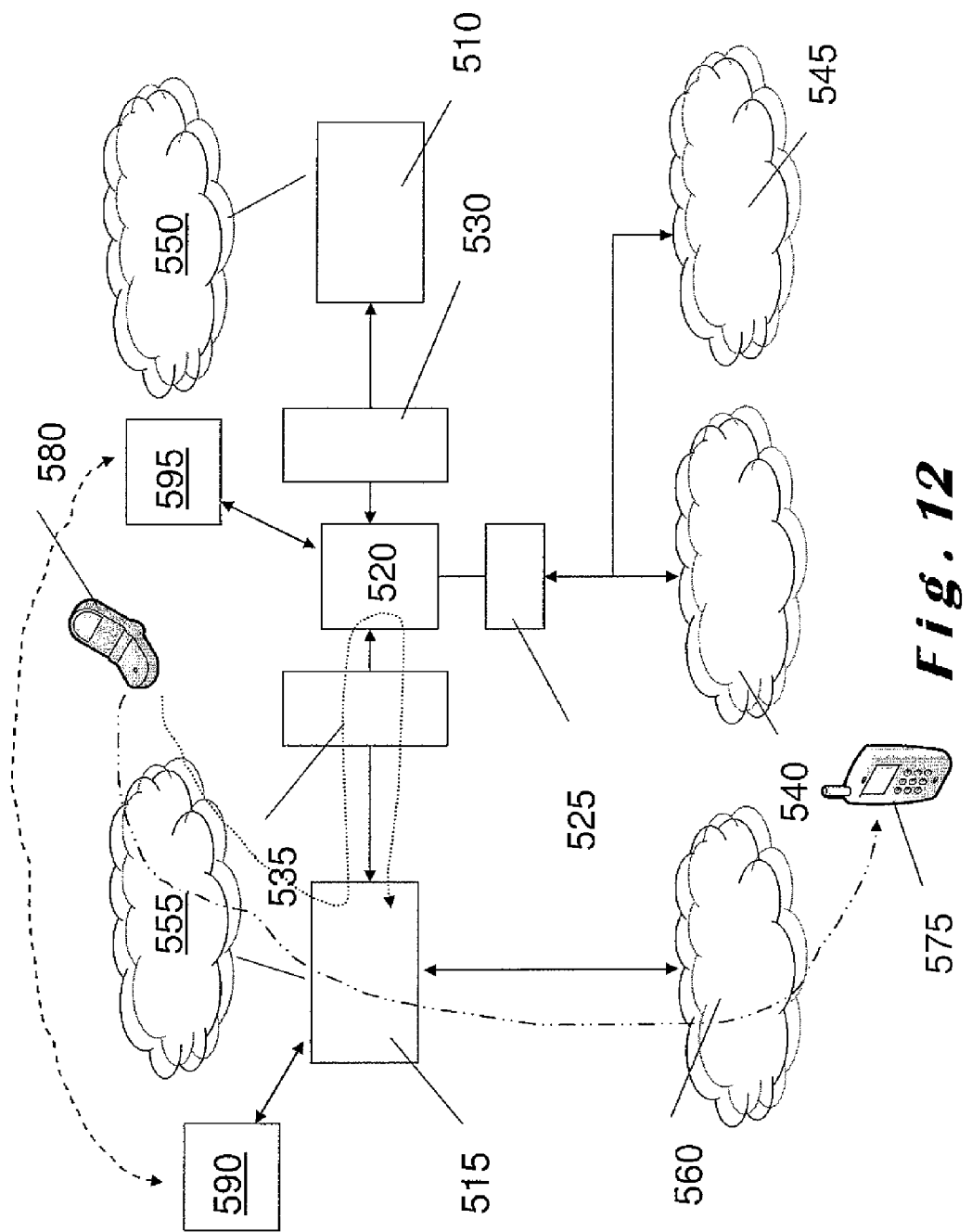
FIG. 12 is similar to FIG. 8 and illustrates ISUP and INAP anchoring.

FIG. 12 is similar to FIGS. 9 and 10 and includes IN architecture modules 590, 595 associated with the MSC/HLR module 515 and with the SIP core 520 respectively. Here, IN integration is required between the IN architecture modules 590 and 595 as indicated by a dashed line. SS7 INAP signalling is provided via the IN integration. When a call is initiated from the fixed or mobile user 580, it is set up via SS7 ISUP and INAP implementation via IN integration as shown by a dotted line. As the dual mode terminal 575 is not connected to Wi-Fi, the call is signalled back to the MSC/HLR module 515 and connects through to the dual mode terminal 575 in the same way as described above with reference to FIG. 11. The path of the call is shown by a dot-dash line as before.

As described above, VQC is used to initiate handover between an IP network and a GSM or other network in accordance with a predetermined minimum VCQ level. This minimum VCQ level can be set using VCQ indicators as described above. However, VCQ indicators may also be set in accordance with subscriber (user) preferences, for example, cost, acceptable VCQ lower than the recommended level, type of terminal, number of terminals that the user has, location of the terminal(s) and the availability.

As described above, as part of the MMC architecture, a VQC module is provided on both the platform and the multi-mode terminal. For handover of a voice call from an IP network to another network, the VQC module located either as part of the multi-mode terminal or as part of the MMC platform as described above, determines whether the voice call quality falls below the predetermined minimum voice call quality level required for an IP network connection. In some instances, both VQC modules may together provide the determination that the voice call quality has fallen below the predetermined minimum voice call quality level.

Having determined that the voice call quality level is below the predetermined minimum set in accordance with the preferences of the user and/or system provider, handover is initiated by the VCC module located on either the platform or the multi-mode terminal. In some instances, both VCC modules may together initiate call handover. The call handler in the platform establishes a new call leg whilst maintaining the existing call leg. Handover is carried out when the new call leg has been established, and the old call leg is terminated once handover is complete. This handover is seamless to the user of the multi-mode terminal.

When it is determined that handover of an existing call is needed, the server, for example, the MMC platform, contacts the client, for example, the multi-mode terminal, to advise that handover is necessary. The client responds that it is happy to handover based on the surrounding environment, for example, there are no other IP networks available in the vicinity to which the client can connect. Once the server receives the acknowledgement from the client, the call handler is instructed to establish a new call leg whilst maintaining the old call leg and to effect handover once the new call leg has been established and then to terminate the old call leg as described above.

It will be appreciated that the present invention is not limited to the specific embodiments described above, but may encompass alternatives and/or additions.

The invention claimed is:

1. A multi-mode communication system including at least one internet protocol network, at least one mobile telecommunications network, a telecommunications platform and at least one multi-mode terminal, both said telecommunications platform and said at least one multi-mode terminal being connectable to said at least one internet protocol network and to said mobile telecommunications network, said system comprising:
    at least one voice continuity control module for ensuring call continuity for a call involving said at least one multi-mode terminal when connected to said at least one internet protocol network;
    wherein said system further comprises at least one voice quality control module for determining voice call quality of a call involving said at least one multi-mode terminal when connected to said at least one internet protocol network;
    wherein said at least one voice continuity control module operates to initiate handover between said at least one internet protocol network and said at least one mobile telecommunications network in accordance with a predetermined minimum voice quality level determined by said at least one voice quality control module; and
    wherein said telecommunications platform comprises a first voice quality control module and a first voice continuity control module and said multi-mode terminal comprises a second voice quality control module and a second voice continuity control module, said predetermined minimum voice quality of an ongoing call being determined by at least one of said first and second voice quality control modules and said handover being initiated by at least said first voice continuity control module.

2. The system according to claim 1, further comprising a call handler associated with said at least one voice continuity control module, said call handler operating to initiate handover between said at least one internet protocol network and said at least one mobile telecommunications network.

3. The system according to claim 1, wherein handover is initiated in accordance with internet protocol network availability.

4. The system according to claim 1, wherein handover is initiated in accordance with mobile telecommunications network availability.

5. The system according to claim 1, further comprising a real-time transport control protocol module providing real-time transport control protocol relating to voice traffic of said call, said predetermined minimum voice quality level being determined in accordance with said real-time transport control protocol.

6. The system according to claim 1, further comprising a real-time protocol analyzer module providing real-time protocol data relating to voice traffic of said call, said predetermined minimum voice quality level being determined in accordance with said real-time protocol.

7. The system according to claim 1, further comprising a database for storing data relating to at least one user of the system, said predetermined minimum voice quality level being determined in accordance with said user data.

8. The system according to claim 1, further comprising a location register for storing terminal data relating to multi-mode terminals associated with said system, said predetermined minimum voice quality being determined in accordance with said terminal data.

9. The system according to claim 1, wherein said second voice quality control module includes an internet protocol manager for detecting availability of said at least one internet protocol network and for determining if voice quality meets said predetermined minimum voice quality associated with said at least one internet protocol network.

10. A multi-mode terminal for use in a multi-mode communications system according to claim 1, said multi-mode terminal comprising a voice quality control module including an internet protocol manager for detecting availability of said at least one internet protocol network and for determining if voice quality meets said predetermined minimum voice quality associated with said at least one internet protocol network.

11. The multi-mode terminal according to claim 10, wherein handover is initiated in accordance with internet protocol network availability.

12. The multi-mode terminal according to claim 10, wherein handover is initiated in accordance with mobile telecommunications network availability.

13. The multi-mode terminal according to claim 10, further comprising a voice continuity control module for initiating handover between said at least one internet protocol network and said mobile telecommunications network when said voice quality falls below said predetermined minimum voice quality.

14. The multi-mode terminal according to claim 10, wherein said multi-mode terminal connects to an internet protocol network in preference to a mobile telecommunications network.

15. The multi-mode terminal according to claim 10, further comprising a real-time transport control protocol module providing real-time transport control protocol relating to voice traffic of said call, said predetermined minimum voice quality level being determined in accordance with said real-time transport control protocol.

16. The multi-mode terminal according to claim 10, further comprising a real-time protocol analyzer module providing real-time protocol data relating to voice traffic of said call, said predetermined minimum voice quality level being determined in accordance with said real-time protocol.

* * * * *